United States Patent [19]
Przelomiec et al.

[11] Patent Number: 5,915,212
[45] Date of Patent: Jun. 22, 1999

[54] SYSTEM AND METHOD FOR ACHIEVING EXTENDED RADIO COVERAGE AND ADDITIONAL CAPACITY USING EXTENDED FREQUENCY BANDS

[75] Inventors: Thomas A. Przelomiec, Lynchburg, Va.; Leo Li, Trabuco Canyon, Calif.; John R. Lane, Forest; Brian D. Justin, Lynchburg, both of Va.; Seyed Tabaian, Canal Wincher, Ohio; John R. Rowland, Amherst; Robert Blaser, Evington, both of Va.

[73] Assignee: Ericsson Inc., Research Triangle Park, N.C.

[21] Appl. No.: 08/703,631

[22] Filed: Aug. 29, 1996

[51] Int. Cl.$^6$ ............................................. H04B 1/44
[52] U.S. Cl. ........................ 455/83; 455/82; 455/426; 455/552
[58] Field of Search ................................. 455/82, 83, 78, 455/79, 552, 553, 426, 432, 454, 509, 517, 524, 80, 81; 375/216, 217; 333/101, 103

[56] References Cited

U.S. PATENT DOCUMENTS

| | | | |
|---|---|---|---|
| 4,677,688 | 6/1987 | Yoshikara et al. | 455/83 |
| 5,020,093 | 5/1991 | Pireh | 455/552 |
| 5,179,721 | 1/1993 | Comroe et al. | 455/552 |
| 5,228,074 | 7/1993 | Mizikovsky | 455/553 |
| 5,276,914 | 1/1994 | Ishizuka et al. | 455/83 |
| 5,406,615 | 4/1995 | Miller, II et al. | 455/552 |
| 5,550,895 | 8/1996 | Burson et al. | 455/552 |
| 5,564,076 | 10/1996 | Auvray | 455/553 |
| 5,689,817 | 11/1997 | Fok | 455/83 |
| 5,715,525 | 2/1998 | Tarusawa et al. | 455/78 |
| 5,768,691 | 6/1998 | Matero et al. | 455/78 |
| 5,809,405 | 9/1998 | Yamaura | 455/82 |

FOREIGN PATENT DOCUMENTS

| | | |
|---|---|---|
| 0 287 671 | 10/1988 | European Pat. Off. . |
| 0 481 825 | 4/1992 | European Pat. Off. . |
| 0 631 400 | 12/1994 | European Pat. Off. . |
| 2 664 766 | 1/1992 | France . |

*Primary Examiner*—Reinhard J. Eisenzopf
*Assistant Examiner*—Lester G. Kincaid
*Attorney, Agent, or Firm*—Nixon & Vanderhye P.C.

[57] ABSTRACT

The present invention provides increased geographical coverage and system capacity for mobile/portable radio transceivers using adjacent and typically separate radio communication frequency bands. A radio that transceives in just one frequency band is adapted to provide a configurable duplexing arrangement to permit communications in extended frequency bands. Duplexing circuitry is connected between the radio antenna and the radio transmitter and receiver. Depending upon the mode of operation of the radio transceiver, switches are selectively operated for variously configuring the antenna, duplexer circuitry, receiver, and transmitter to permit communications in a first or a second set of transmit/receive frequency bands. In one preferred example embodiment, only a single duplexer is employed connected to the antenna and transceiving circuitry through plural switches.

15 Claims, 9 Drawing Sheets

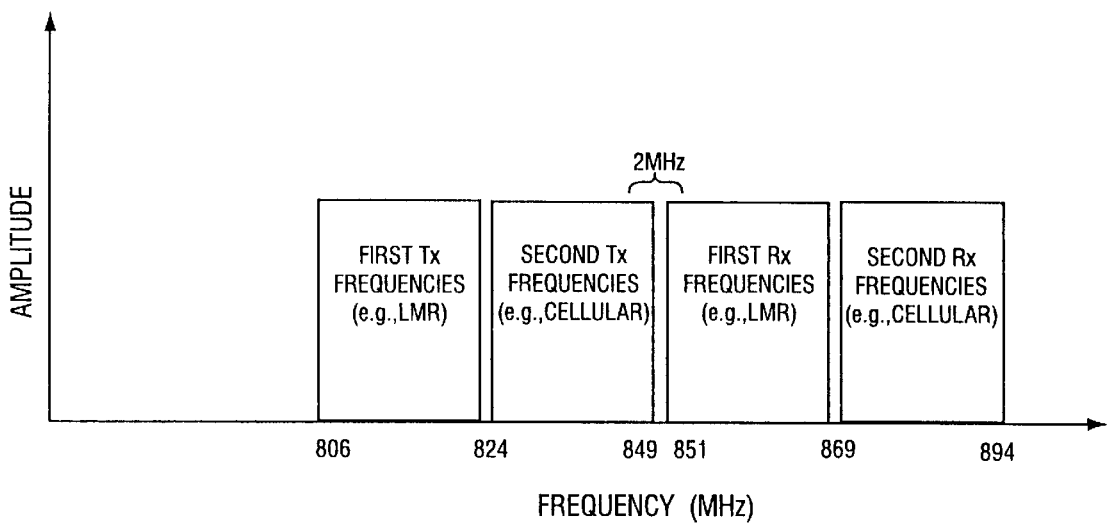
FIG. 1 *(Prior Art)*
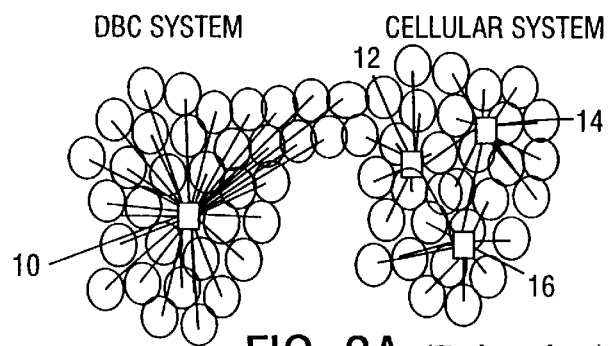
FIG. 2A *(Prior Art)*
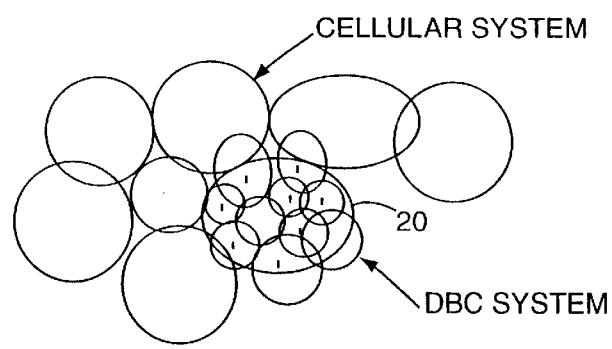
FIG. 2B *(Prior Art)*

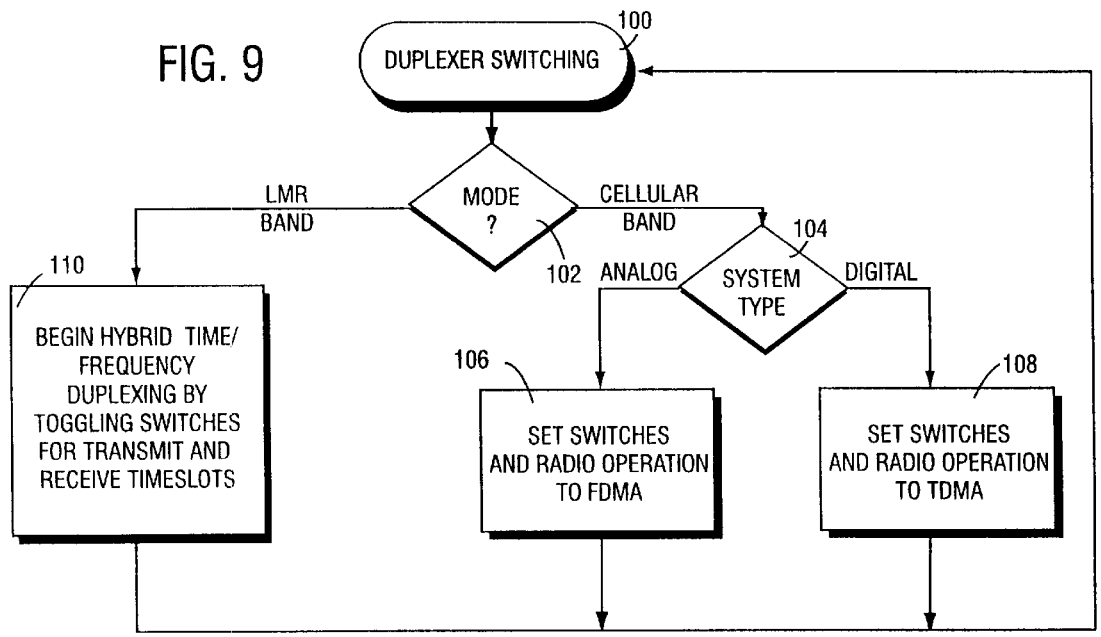
FIG. 9
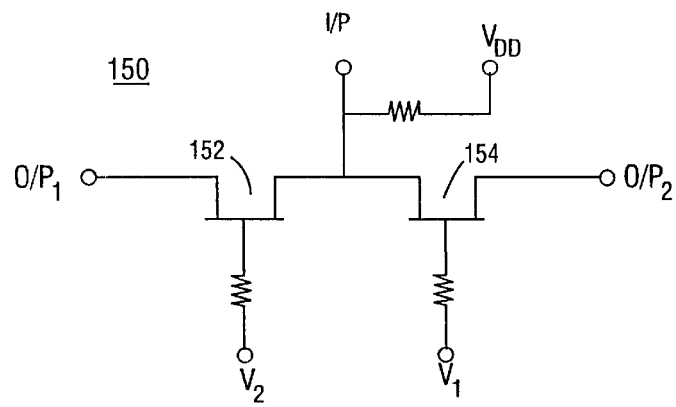
FIG. 11A
| $V_1$ | $V_2$ | $O/P_1$ - $O/P_2$ | I/P, $O/P_1$, $O/P_2$ |
|---|---|---|---|
| $V_{DD}$ | 0 | ISOLATION INSERTION LOSS | INSERTION LOSS ISOLATION |
| 0 | $V_{DD}$ | | |
FIG. 11B

SYSTEM AND METHOD FOR ACHIEVING EXTENDED RADIO COVERAGE AND ADDITIONAL CAPACITY USING EXTENDED FREQUENCY BANDS

RELATED APPLICATIONS

This application is related to U.S. patent application Ser. No. 08/622,403, entitled "A Method and Apparatus for Locating a Digital Control Channel in a Downbanded Cellular System," to T. Przelomiec and K. Raith, filed on Mar. 27, 1996, and is related to U.S. patent application Ser. No. 08/622,631, entitled "Control Channel Synchronization Between DBC and Cellular Networks," to T. Przelomiec and T. Brown, filed on Mar. 27, 1996, and is related to U.S. patent application Ser. No. 08/622,311, entitled "Downbanded Cellular Systems and Methods," to Thomas A. Przelomiec, filed on Mar. 27, 1996. The disclosure of these related applications is expressly incorporated here by reference.

FIELD OF THE INVENTION

The present invention relates generally to radio communication systems, and more particularly, to increasing the capacity and/or coverage area of existing communication systems. In one application, the present invention relates to a time/frequency duplexing technique to achieve extended radio transceiver frequency band coverage in adjacent frequency bands.

BACKGROUND AND SUMMARY OF THE INVENTION

The rapid growth of radio communication systems such as cellular radio has compelled designers to search for ways in which system capacity can be increased without reducing communication quality. One way in which increased capacity can be provided is by increasing the efficiency in which the available cellular spectrum is used, e.g., by changing from analog to digital communication techniques. In North America, this change was implemented by transitioning from the analog "AMPS" system to a digital system "D-AMPS" which was standardized as IS-54B and later as IS-136. Other technological improvements, such as the implementation of Time Division Multiple Access instead of Frequency Division Multiple Access, have also increased system capacity. Even with the implementation of more spectrally efficient technologies, the need for more capacity in cellular communication systems continues to be a concern.

Another way in which the capacity of cellular communications system can be increased is to provide additional spectrum. For example, the FCC originally allocated two blocks of frequencies (i.e., 825–845 MHz (uplink) and 870–890 MHz (downlink)) for cellular service in the United States. In 1987, the FCC allocated an additional 5 MHz to each frequency block to increase capacity. Of course, this solution is limited since the usable frequency spectrum is finite and existing communication systems other than cellular already occupy portions of the usable spectrum.

Land Mobile Radio (LMR) systems are allocated frequency blocks, i.e., 806–824 MHz (uplink) and 851–869 (downlink), which are contiguous with those of the cellular band as shown in FIG. 1. In contrast to cellular radio systems, LMR systems are transmission trunked systems commonly used to provide radio communication service between individual radio units of a particular organization. For example, police departments use a version of LMR (commonly referred to as public service trunked (PST) systems) to communicate between patrol cars and a dispatcher at police headquarters. LMR systems have historically been implemented as independent sites covering a relatively large geographic area and serviced by one (or a few) transmitting base stations. Cellular systems on the other hand cover an even wider geographical area divided into many smaller "cells" each of which is serviced by its own transmitting base station. More recently, LMR multisite systems have been developed and implemented to expand geographical coverage as well in the LMR arena. At each LMR site, an LMR operator is allocated a portion of the LMR spectrum within which a fixed frequency pair is typically selected for use as a control channel while all of the other frequencies are used for traffic.

In 1994, the FCC announced that the frequency spectrums allocated for LMR, cellular, and personal communications systems (PCS) would be uniformly regulated. An operator can therefore now use frequencies within the combined bandwidth in any desired manner. Coupled with other regulatory changes, for example those which allow LMR spectrum to be licensed on a wide-area basis rather than a site-by-site basis, LMR frequencies may now be used for cellular communications. Use of the LMR frequency spectrum for cellular communications is referred to herein as "downbanded cellular (DBC)."

To implement DBC systems that are compatible with cellular systems, several challenges must first be addressed. For example, conventional LMR systems operating in the United States have 25 Khz channel widths, whereas cellular system operating in accordance with IS-54B have 30 KHz channel widths. One solution to this problem is provided in the above-referenced U.S. patent application Ser. No. 08/622,311, entitled "Downband Cellular Systems and Methods" where the conventional channelization of the LMR spectrum is redefined in a manner which provides significant advantages. More specifically, for every six originally specified, 25 KHz LMR channels, five new 30 KHz DBC channels are specified. In this way, complete compatibility with cellular systems, e.g., allowing roaming between cellular and DBC systems, is achieved.

As can be seen in FIG. 1, there is only a 2 MHz gap between the maximum cellular transmit frequency (849 MHz) and the minimum LMR receive frequency (851 MHz). This small frequency gap contrasts with the 20 MHz maximum transmit/minimum receive frequency gap normally used in DAMPS cellular phones. The 20 MHz frequency gap spacing is satisfactory given the ceramic duplexing filters used in cellular radios to maintain isolation between the transmitted and received signals. However, current filter materials technology (ceramic duplexers included) are unable to permit construction of a single LMR "plus" cellular ceramic duplexer filter that provides the ideal inband "flatness" and out-of-band rejection for such a narrow 2 MHz gap shown in FIG. 1.

Accordingly, it is an object of the present invention to provide a duplexing arrangement which permits increased frequency band coverage into what has traditionally been separate radio communication frequency bands.

It is a further object of the present invention to provide such a duplexing arrangement using transceiver hardware already present in the radio conventionally configured to transceive in just one frequency band, e.g., a cellular radio.

It is a further object of the present invention to use only a single duplexer in an extended-band radio transceiver.

It is a further object of the present invention to manufacture such an extended band radio inexpensively and without increasing the number of components or the size of components.

A further object of this invention is to adapt the duplexing circuitry of a cellular radio which is compatible with the IS-136 specification for cellular phones and to permit additional "downbanded" communications in land mobile radio frequency bands.

The present invention provides a radio transceiver having the capability to transceive information over first and second different sets of frequencies. Each set of frequencies includes a transmit frequency band and a receive frequency band. One example of the first and second sets of frequencies are the transmission/reception allocation for land mobile cellular radios. The radio transceiver includes a transmitter, receiver, and antenna. Duplexing circuitry is connected between the antenna and the transmitter and receiver. Depending upon the mode of operation of the radio transceiver for communications either in the first or in the second set of frequencies, switches are provided for variously configuring the antenna, duplexer circuitry, receiver, and transmitter.

In one preferred example embodiment of the present invention, only a single duplexer is employed that permits the radio to transceive over both the first and second sets of frequencies. Switches connect the one duplexer to the antenna of the radio and to the receiver and transmitter. To operate in the first set of transmit/receiver frequency bands, the switches are set to connect the duplexer between the antenna and both the transmitter and receiver. To transceive in the other set of transmit/receiver frequency bands, the switches are set to bypass the duplexer in connecting the antenna and the receiver at least in the receive path.

Thus, the present invention therefore may be used to adapt a cellular radio that originally transceives over formally designated cellular transmit and receive frequency bands to transceive in land mobile radio (LMR) transmit and receive frequency bands contiguous with the cellular transmit and receive frequency bands using only a single cellular duplexer. Cellular frequency transmissions and receptions are routed as usual through the duplexer. LMR frequency transmissions may be routed through the duplexer, while LMR receptions are routed through the switches.

In one example application to time slot based communications systems, e.g., TDMA systems, the control of the switches in the extended frequency bands is accomplished using a control signal generated based on time slot alignment timing. When transceiving in the cellular frequency bands, the switches are statically set. In the LMR extended bands, the switches are set dynamically. When the radio is transmitting, the antenna is connected to the transmitter through the duplexer during a transmit time slot. During the transmit time slot, the switches effectively isolate the antenna and the receiver. During a receive time slot, the antenna is connected to the receiver bypassing the one duplexer.

In a preferred embodiment, the switches are implemented using gallium arsenic (GaAs) field effect transistors (FETs) having low insertion loss and rapid switching speed. These switches maintain the required transmit-to-receive isolation that would otherwise be provided by a second duplexer included specifically for the extended frequency band.

Thus, the present invention provides radios with greater geographic coverage as well as improved system access in crowded areas (due to the additional channels provided in the extended frequency bands), and does so in one embodiment without adding a costly, second duplexer to handle calls in the extended frequency bands. Moreover, existing transceiver circuitry like that in conventional cellular radio telephones can be adapted for extended frequency band communications.

BRIEF DESCRIPTION OF THE DRAWINGS

These and other objects of the present invention as well as specific example embodiments of the invention will now be described in conjunction with the following drawings in which like reference numerals refer to like elements:

FIG. 1 is a graph showing the contiguous transmit and receive land mobile radio and cellular frequency bands in the 800 to 900 MHz frequency range;

FIGS. 2A and 2B illustrate the concept of downbanded cellular systems used in combination with existing cellular systems;

FIG. 9 is a flowchart diagram illustrating one example switching control method of the duplexer by the radio controller depending on the mode of operation of the radio in accordance with the second, preferred embodiment of the present invention;

FIG. 11A is a schematic diagram of an example RF switch which may be used in accordance with the present invention; and FIG. 11B is a table illustrating characteristics of the RF switch shown in FIG. 11A.

DETAILED DESCRIPTION OF THE INVENTION

Figure 3:
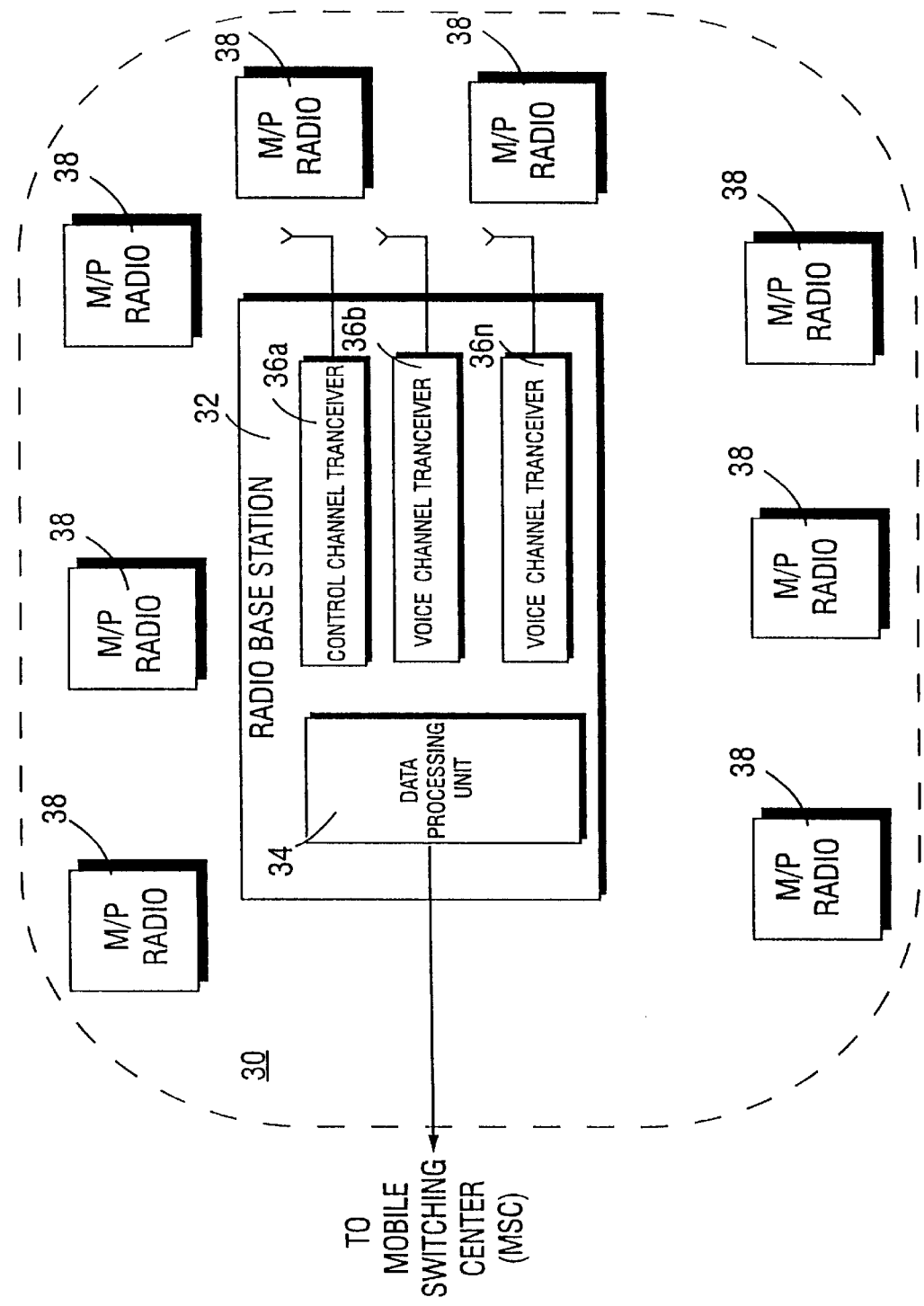
FIG. 3 is a high level drawing of a single "cell" showing a radio base station assigned to a single cell and multiple mobile/portable radios.

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from the specific details. In other instances, detailed descriptions of well known methods, devices, and circuits, are omitted so as not to obscure the description of the present invention with unnecessary detail.

Throughout this description, reference is often made to one example application of the present invention to downbanded cellular applications where a cellular radio is modified in order to transceive in both cellular and LMR frequency bands. Those skilled in the art will of course appreciate that this is only an example application and that the present invention may be applied to any communication system where there are reasonably proximate or contiguous frequency bands to provide extended coverage and/or extra capacity to the communications systems. Moreover, while cellular and LMR transmit/receive frequency bands are contiguous, the present invention may also be applied to cover adjacent frequency bands that are not necessarily contiguous.

Downbanded cellular systems include both stand-alone DBC systems which utilize the LMR spectrum and provide enhanced communication services as well as cooperative applications of DBC systems and cellular systems. FIG. 2A illustrates one such cooperative application of DBC systems where a DBC system is positioned adjacent to a cellular system. The DBC system is illustrated as having a plurality of cells each of which are supported by a mobile switching center (MSC) 10 typically used in existing cellular radio systems. Similarly, the cellular system has a plurality of cells supported by three such MSCs 12, 14, and 16. Each geographical "cell" (shown as a circle or an oval) includes one or more stationary radio base stations (not shown) connected to a respective MSC for transmitting radio signals to, and receiving radio signals from, mobile/portable radios within the cell. In this example configuration, the DBC system provides additional geographic coverage which would allow, for example, the operator of a cellular system to provide greater geographic service to its mobile/portable radio subscribers should they "roam" into a cell in the DBC system.

Another cooperative example is illustrated in FIG. 2B where each of the larger circles and ovals represents a cellular system and each of the smaller circles within cellular system 20 represents a DBC system. This example illustrates a case where DBC systems are coincident with a cellular system and can be used to supplement the cellular system's capacity, i.e., handle more simultaneous calls.

With these example applications of DBC systems described at a cell level, some general details of radio base stations and mobile/portable radio stations are provided to round out this discussion, but without providing an unnecessary amount of detail that might obscure the present invention. DBC radio base stations and mobile/portable radio stations may be manufactured using substantially the same components as conventional cellular base stations and mobile/portable radio stations, with a few exceptions, e.g., DBC equipment includes necessary radio frequency (RF) communication hardware (and software) to operate in the LMR frequency band. Additional information relating to more specific details of example radio mobile and base station implementations are directed to co-pending, commonly assigned, U.S. patent application Ser. No. 07/967,027 entitled "Multi-Mode Signal Processing," filed on Oct. 27, 1992 to P. Dent and B. Ekelund, which disclosure is incorporated here by reference. DBC systems may also be implemented in accordance with D-AMPS as specified in EIA/TIA IS-54B and IS-136, the disclosures of which are also incorporated herein by reference.

FIG. 3 represents a block diagram of a cell that may be used in a downbanded cellular radio communication system. The cell 30 shows an example radio base station 32 and plural mobile/portable (MIP) transceivers 38 in the cell 30. The radio base station 32 includes a data processing unit 34 which is connected to the mobile switching center (MSC) which in turn is connected to the public switched telephone network (PSTN) and possibly other networks (not shown).

The radio base station 32 for cell 30 includes a plurality of voice channels handled by corresponding voice channel transceivers (36b . . . 36n) controlled by the data processing unit 34. Also, the radio base station 32 includes a control channel transceiver 36a which may be capable of handling more than one control channel. The control channel transceiver 36a is also controlled by the data processing unit 34. In general, the control channel transceiver 36a transceiver controls information over the control channel of the base station or cell with mobiles/portables 38 tuned to that control channel (unless conducting an active call via one of the voice or data channel transceivers). Voice channel transceivers handle the traffic channels which may carry voice and data information. When a mobile/portable radio 38 first enters the idle mode, it locates and tunes to a DBC control channel to acquire overhead control information and listen for pages. Example techniques for locating a DBC control channel are described in the above-incorporated U.S. patent application entitled "A Method and Apparatus for Locating a Digital Control Channel in a Downbanded Cellular System."

Advantageously, the center frequencies for DBC channels may be specified to maximize compatibility with existing cellular systems. For example, the center frequencies may be selected based upon the known harmonics of frequency synthesizing oscillators typically used in cellular equipment so that the same oscillators can be used in DBC equipment to minimize equipment costs. This is particularly valuable when the DBC equipment can transmit over multiple frequency bands, e.g., capable of operating in more than one of the LMR, cellular, and the PCS frequency bands.

As mentioned above, one of the most significant hardware challenges of providing a cellular transceiver with ability to hand over and roam—seamlessly and compatibly—between land mobile radio (LMR) and cellular frequency bands relates to filtering, and in particular, duplex filtering. For purposes of this description, a duplexer is a filter that functions as a two channel multiplexer using a transmit-receive switch so that one antenna may be used for both reception and transmission. More particularly, there is only a 2 MHz gap between the maximum cellular transmit frequency of 849 MHz and the minimum land mobile radio receive frequency of 851 MHz. Existing filter materials, e.g., present ceramic duplex filters, are not able to provide simultaneous in band flatness and out of band rejection for both cellular and LMR transmit and receive frequency bands as well as the necessary isolation between transmit and receive bands.

Figure 4:
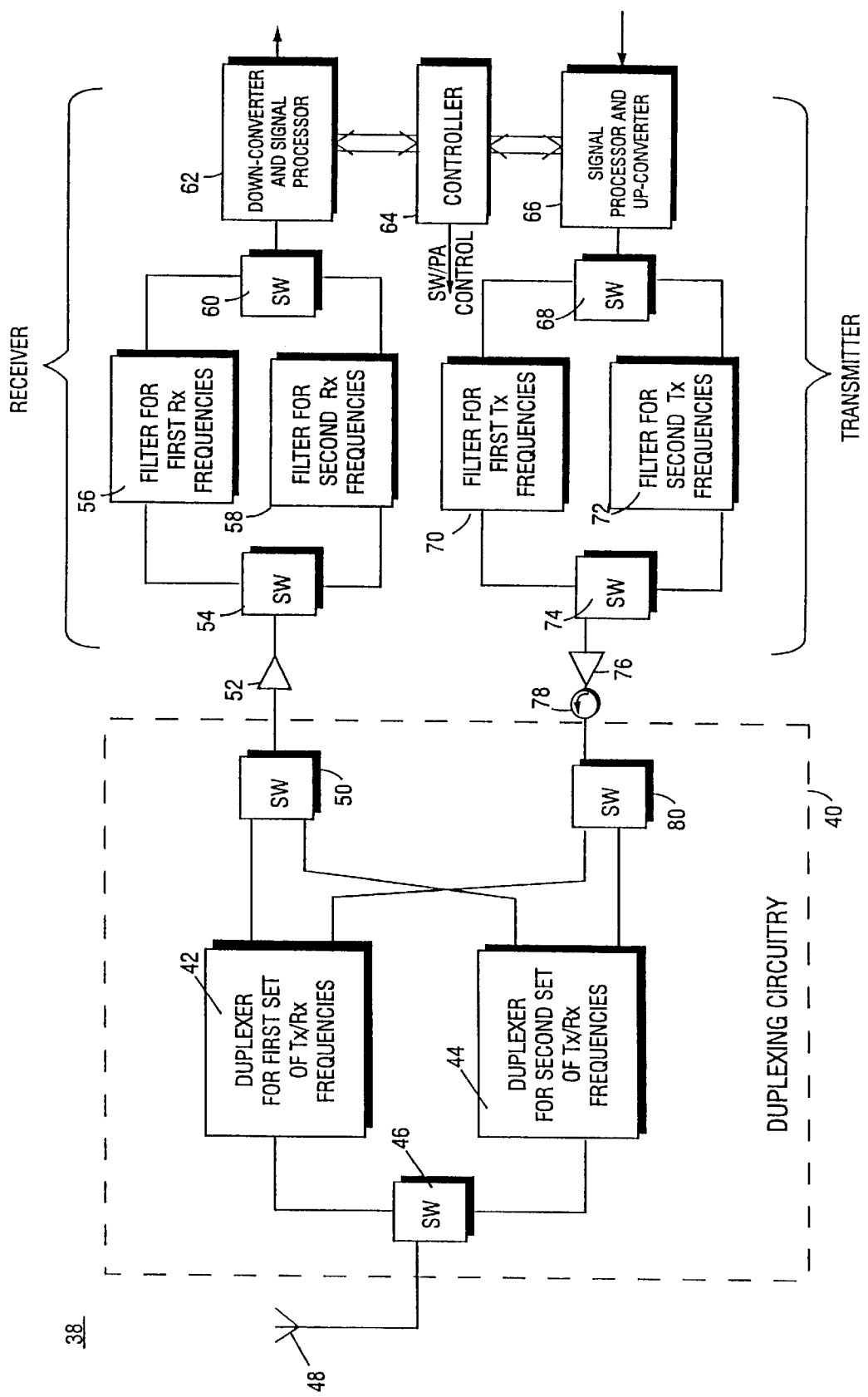
FIG. 4 is a function block diagram of a radio originally constructed to operate using one set of frequencies adapted to conduct communications in an additional, extended set of frequencies in accordance with a first example embodiment of the present invention.
Figure 5:
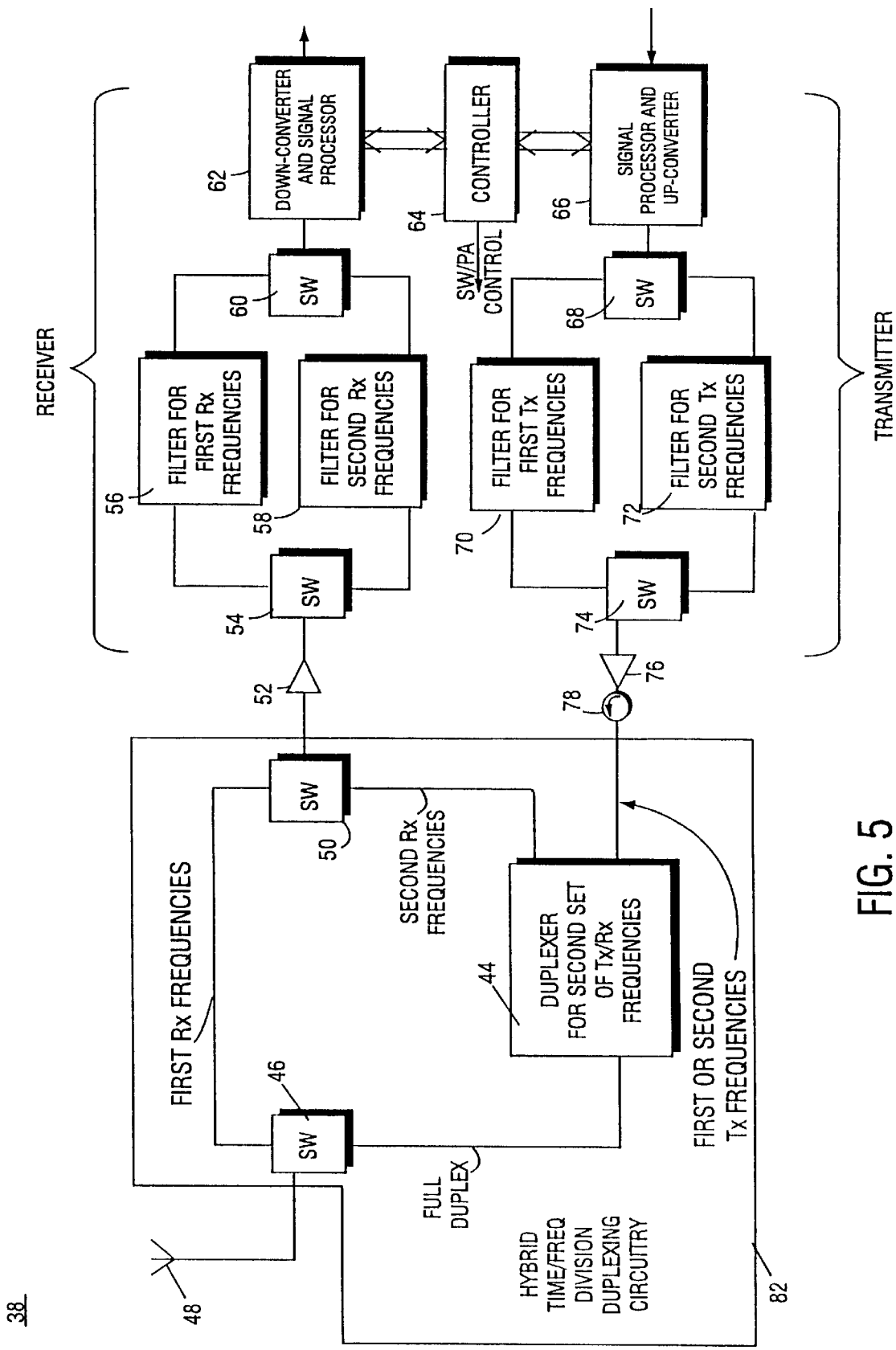
FIGS. 5–8 are function block diagrams of a mobile radio telephone configured to communicate over a first set of transmit and receive frequencies adapted to transceive over a second set of adjacent transmit and receive frequencies in accordance with a second, preferred example embodiment of the present invention.

FIG. 4 illustrates one example mobile/portable radio transceiver hardware configuration which provides extended frequency coverage from one set of transmit/receive (Tx/Rx) frequencies to two sets of Tx/Rx frequencies, e.g., LMR/cellular coverage. Mobile/portable radio transceiver 38 includes a single antenna 48 connected to the radio's receiver and transmitter paths generally indicated in FIG. 4. Duplexing circuitry 40 includes an RF switch 46 connected to a first duplexer 42 for duplexing a first set of transmit/receive frequencies (such as the land mobile radio band of frequencies) and a second duplexer 44 for duplexing a second set of transmit/receive frequencies (such as the cellular frequency band). The received signals from RF switch 50 are coupled to amplifier 52 (which is preferably a low noise amplifier), the output of which is routed by RF switch 54 to band pass filter 56 which passes the receive frequency band for the first set and to band pass filter 58 which passes the receive frequency band corresponding to the second set. RF switch 60 couples the outputs from the received filters to down converter and signal processor circuitry 62 which generates a baseband output signal used, for example, to drive a speaker, etc.

The transmitter includes a signal processor and up-converter 66 for processing a signal to be transmitted and converting it to an RF signal. The RF signal to be transmitted is received by RF switch 68 and appropriately routed to a band pass filter 70 for the transmit band of frequencies the first set of frequencies, and to band pass filter 72 for the transmit frequency band for the second set of frequencies. The filtered outputs are passed via RF switch 74 to RF power amplifier 76. The power amplifier output may be directly routed to the duplexing circuitry 40. However, a circulator 78 may be optionally provided to buffer the power amplifier 76 and protect it from reflected antenna waves antenna as well as provide a stable, fixed impedance. RF switch 80 routes the amplified RF signal to both one of the first and second duplexers 42 and 44 which pass signals in their respective transmit frequency bands to antenna 48 for transmission via RF switch 46.

Control signals for controlling the down converter/signal processor 60 and signal processor/up converter 66 are provided by controller 64 which may include a suitably programmed microprocessor and/or digital signal processor. Controller 64 also provides additional control signals for controlling the RF switches 46, 50, 54, 60, 68, 74, and 80 as well as the transceiver and duplexer circuitry. In particular, the controller generates switching and power amplifier control signals for activating or deactivating the power amplifier and for controlling the switch state of various ones of the RF switches in accordance with appropriate timing control signals.

In response to the mode of operation of radio 38—either in the first set of Tx/Rx frequencies or in the second set of Tx/Rx frequencies, switches 46, 50, and 80 are set by controller 64 to engage either the first duplexer 42 or the second duplexer 44. The switches are quasi-static in that they change only when the transceiver 38 hands over from operation in the first set of Tx/Rx frequencies to the second set of Tx/Rx frequencies (or vice versa).

Essentially, in this first example embodiment in accordance with FIG. 4, the interface between the antenna and the transmitter/receiver paths includes the duplexing hardware from two radios in one radio. Assuming suitable software changes to control the switching and transceiver hardware to tune to frequencies in both first and set bands, the radio has the ability to roam seamlessly and compatibly into two different frequency bands such as the cellular and land mobile radio frequency bands.

Unfortunately, the extended band radio in accordance with the first embodiment achieves this extended band of frequencies at increased cost, size, and power loss. Duplexers are particularly costly components and are also quite large, occupying a considerable amount of "real estate" on printed circuit boards upon which various radio transceiver and signal processing hardware are mounted. Increased cost is undesirable. Increased size is also undesirable since a very important factor in portable phones is small size. The other drawback of an additional duplexer is that it contributes a 1.0–1.5 dB loss in the transmit path and a 2.5–3.0 dB loss in the receive path. Both of these losses degrade output power and sensitivity, and therefore reduce the effective operating range of the radio.

A second, preferred embodiment of the present invention which overcomes the disadvantages with the first embodiment is now described in conjunction with FIGS. 5–8. In the second preferred embodiment of the present invention, the frequency division duplexer 40 has been replaced with hybrid time/frequency division duplexing circuitry 82. Advantageously, the hybrid time/frequency division duplexing circuitry 82 includes only one duplexer (rather than two) corresponding in the example in FIG. 5 to duplexer 44. Even without duplexer 42, the hybrid time/frequency division duplexing circuitry 82 still provides radio transceiving capability over both the first and second frequency bands by dynamically switching RF switches 46 and 50 as described further below.

Much of the circuitry in transceiver 38 is the same as that already described above in conjunction with FIG. 4 (with like reference numerals referring to like elements throughout). Thus, the description of FIGS. 5–8 focuses on the operation of the hybrid time/frequency division duplexing circuitry 82. In general, the controller 64 controls the state of RF switches 46 and 50 based upon the operational mode of the transceiver 38. If the radio is being operated to transceive over the second set of transmit/receive frequencies, the controller 64 sets the RF switches 46 and 50 to a relatively static state which connects antenna 48 to both the receiver and transmitter via duplexer 44. In this mode of operation, duplexer 44 operates as a conventional duplexer switching transmit and receive signals to/from the antenna 48 while maintaining appropriate isolation between transmit and receive signals.

When the radio is operating to transceive over the first set of tx/rx frequencies, RF switches 46 and 50 are operated by controller 64 dynamically in time. In this operational mode, duplexing circuitry 82 switches depending on both the time and the frequency to connect transceived signals between the antenna 48 and the receiver and transmitter. When the radio 38 is transmitting, RF switch 46 is switched to connect antenna 48 to the duplexer 44 so that the transmit signals are passed through duplexer 44 and switch 46 through antenna 48. The transmit filter in duplexer 44 has a wide enough passband, e.g., as a low pass filter, to pass transmit frequencies for both the first and second frequency bands. Alternatively, for received signals, switches 46 and 50 are operated by controller 64 to bypass duplexer 44 with the signal received on the antenna 48 being coupled directly to the receiver.

Figure 6:
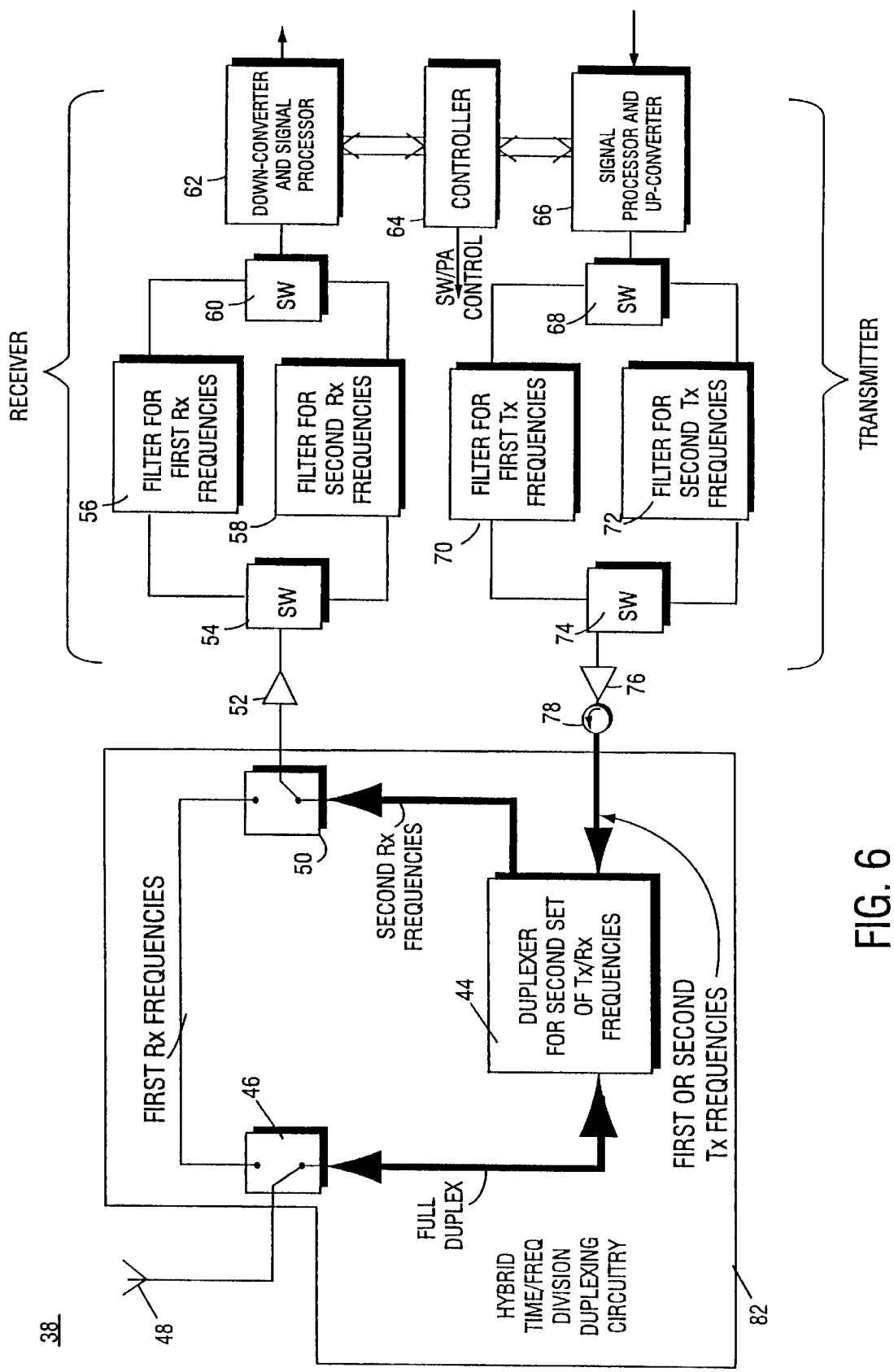

FIG. 6 shows the switch configuration and signal path as controlled by controller 64 when the radio transceiver 38 is transceiving signals in the second set of transmit and frequency bands. If radio 38 is initially or primarily a cellular radio, the duplexer 44 could correspond to a cellular duplexer designed to duplex transmit/receive frequencies in the cellular band. In that instance, the second set of transmit/receive frequencies would correspond to the cellular frequency band. For cellular band communications, controller 64 would set switches 46 and 50 as shown in FIG. 6 to relatively statically (in time) connect antenna 48 to duplexer 44 via a full duplex connection with the transmitter output signal being directly coupled to the duplexer 44, and the signals received on antenna 48 being routed by duplexer 44 through switch 50 to the radio receiver.

Figure 7:
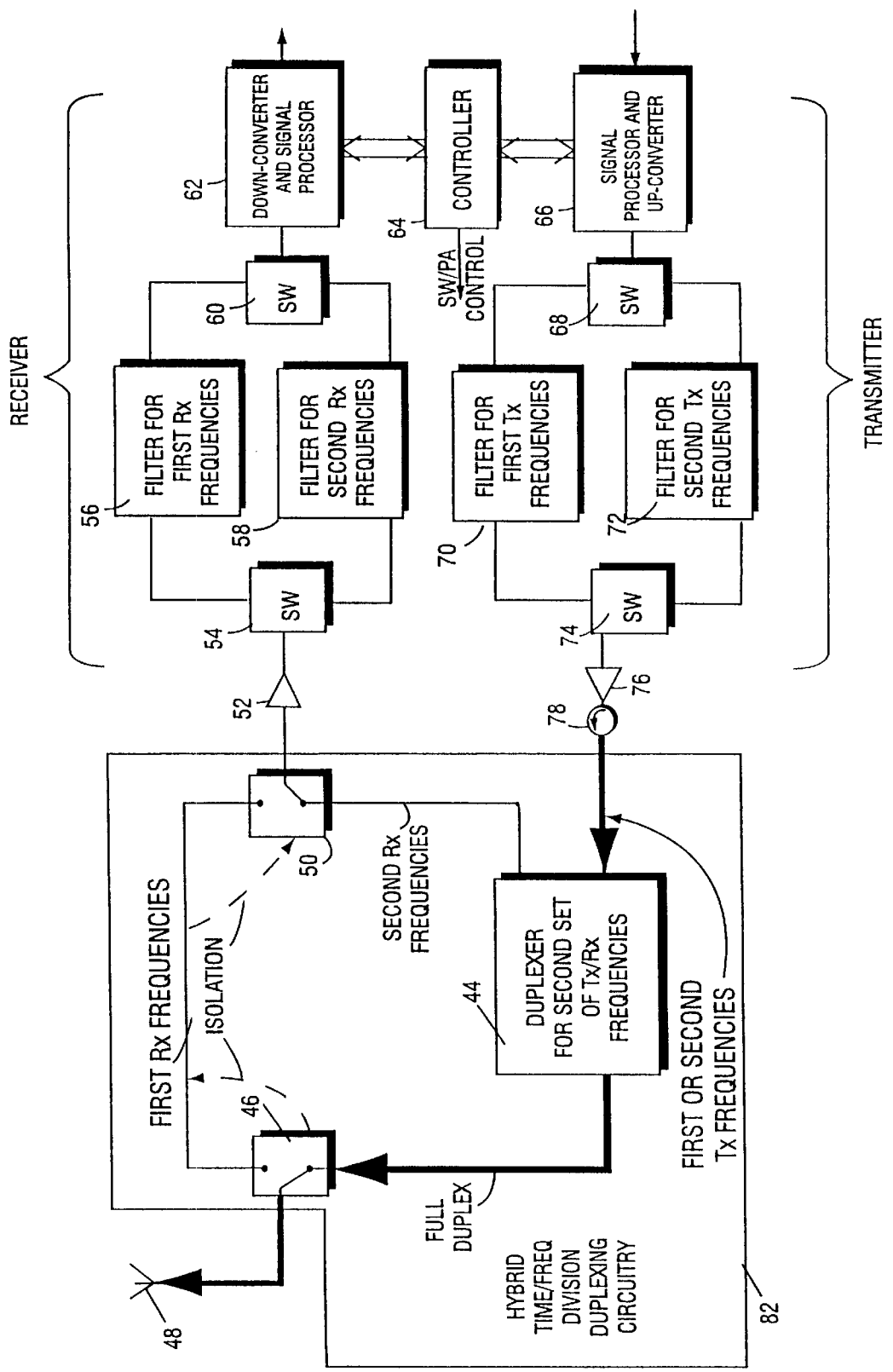
Figure 8:
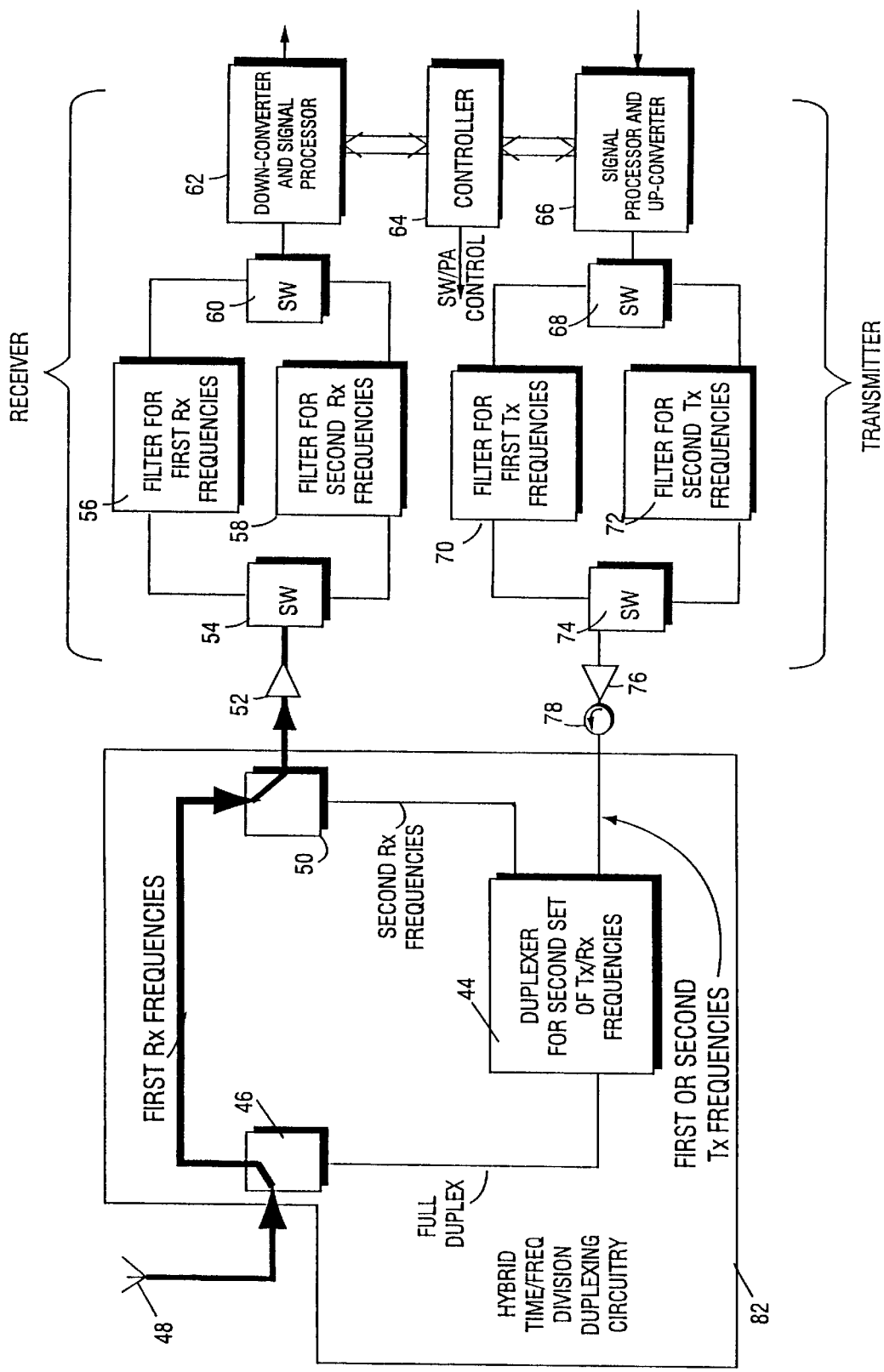

FIGS. 7 and 8 illustrate the switch configuration of hybrid time/frequency division duplexing circuitry 82 and signal paths (shown in bold in the Figs.) when radio transceiver 38 is operated in the first Tx/Rx frequency bands corresponding in an example application to the LMR Tx/Rx frequency bands which are contiguous with the cellular Tx/Rx frequency band. FIG. 7 in particular shows the switch configuration to transmit a signal from the transmitter using duplexer 44 and switch 46. Note in FIG. 7 that the receive path is isolated from the transmitted signal by switches 46 and 50. When a signal is received in the first receive band, FIG. 8 shows that the switches are toggled dynamically in time by controller 64 to the opposite positions to bypass duplexer 44 and route signals from antenna 48 directly to the receiver.

The operational mode of radio transceiver 38 may be set by the operator via a switch/button. Alternatively, the radio transceiver 38 may automatically change operational modes using for example detected signal strength/quality signals or control signals from radio base stations, e.g., hand-over like signals.

FIG. 9 shows a flowchart illustrating the general outline of operation performed by controller 64 to control the operation of switches 46 and 50. Although switches 54, 60, and 74 are also controlled by controller 64, the switch control primarily at issue is that of switches 46 and 50. Accordingly, the controller enters a duplexer switching routine 100 and proceeds to decision block 102 to determine the current mode of operation of the radio transceiver 35. If the radio is operating in the cellular band (one example only), the controller decides (block 104) the type of cellular system. Since most digital cellular radios operate in either analog or digital modes to accommodate communications on older analog cellular systems and newer digital cellular systems. If the cellular system is analog, the controller 64 sets the RF switches so that communications are routed through the single duplexer 44 and commences radio operation in a frequency division multiple access (FDMA) mode (block 106). If the system type is a digital, time slot-based system, the controller 64 sets the RF switches to route transmit and receive signals through the single duplexer 44 and commences radio operation in a time division multiple access (TDMA) mode.

If the radio is operating in a land mobile radio (LMR) frequency band (in this non-limiting example), the controller 64 commences hybrid time/frequency multiplexing by toggling the RF switches for transmit and receive time slots (block 110). As is well known in the art, time division multiple access (TDMA) systems multiplex multiple channels onto a single frequency, with each channel corresponding to a time slot. The time slots are grouped into frames, with each frame carrying for example two or three time slot type channels. Slot alignment and synchronization between transmit and receive time slots between mobile/portable radios and fixed base stations are specified in detail in the IS-54 and IS-136 standards. Timing signals which are generated by the base station for controlling slot alignment and slot synchronization may be readily employed by controller 64 to coordinate the duplexer switching operations in accordance with the present invention. While the timing control signals being used to perform duplexer switching are being described in the context of the time division multiple access system, the present invention is not limited to a time slot environment and may be applied to other types of communications systems including analog systems as long as an appropriate timing signal informs the controller when to make the appropriate controls of switches 46 and 50.

Figure 10A:
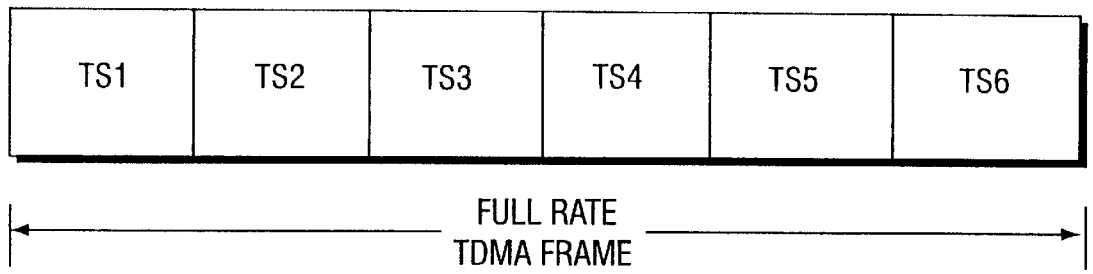
FIGS. 10(A)–10(D) are timing diagrams showing one example technique for generating switch control signals for switching the RF switches in accordance with the present invention using time slot alignment signalling generated in TDMA type cellular systems.
Figure 10B:
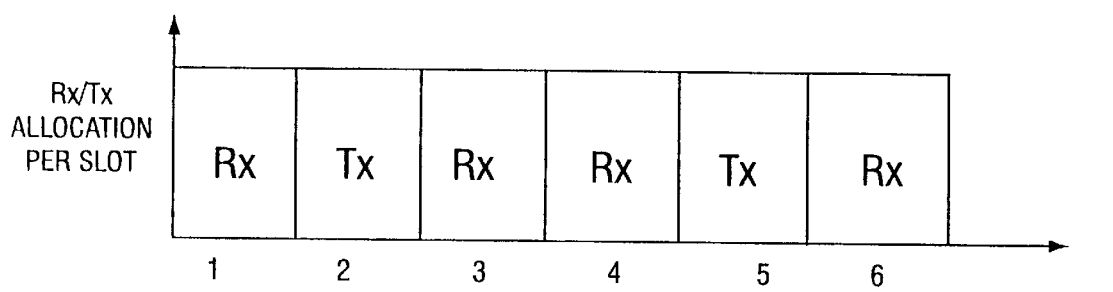
Figure 10C:
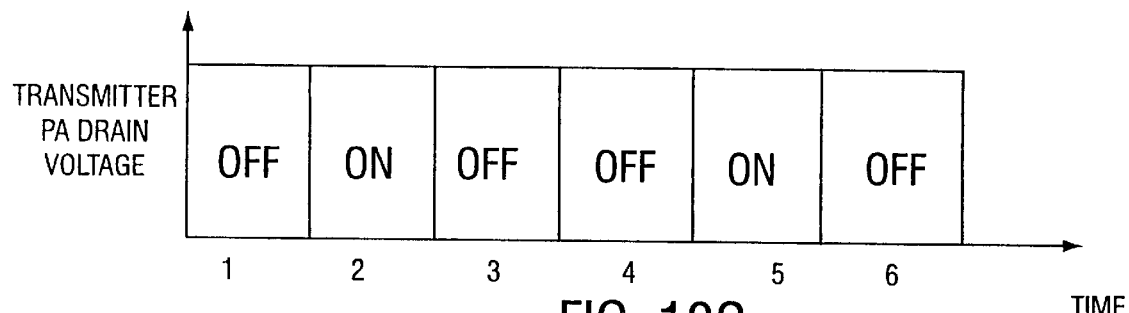
Figure 10D:
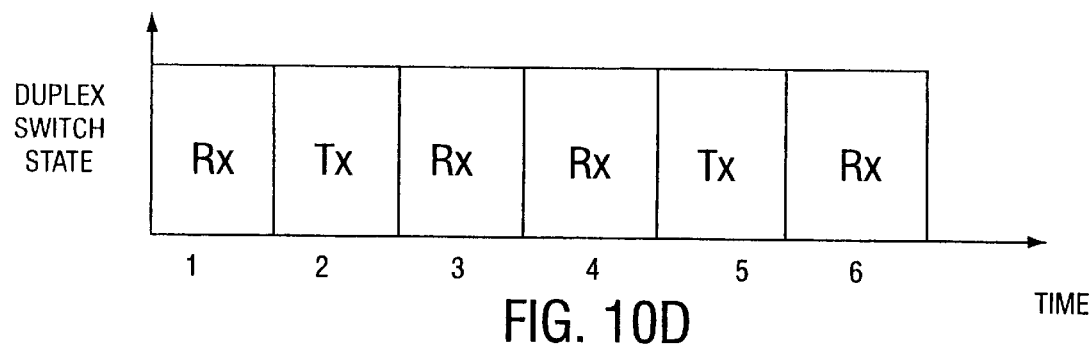

One existing timing signal in the IS-136 is that provided by the controller 64 to power amplifier 76, in particular the power amplifier drain voltage. FIG. 10(A) illustrates a typical full rate TDMA frame which includes six time slots (TS1–TS6). These six time slots are generally configured as a receive (Rx) time slot during which the radio receives information (no transmission occurs) or a transmit (Tx) time slot during which the radio transmits information (no reception occurs). One particular allocation of receive and transmit time slots is illustrated in FIG. 10(B) in accordance with IS-136.1 (Revision 0) dated May 17, 1995. Time slots 1, 3, 4, and 6 are reserved for reception, and time slots 2 and 5 are reserved for transmission. Therefore, as illustrated in FIG. 10(C), the transmitter power amplifier drain voltage is turned "on" (brought to the appropriate voltage level to turn the power amplifier transistors on) only during time slots 2 and 5. Accordingly, the controller 64 also controls the duplexer switches to switch them to appropriate receive and transmit states for the appropriate time slot as indicated in FIG. 10(D).

Thus, a master timing signal from the radio base station is used to apply an appropriate drain voltage to the power amplifier 76 to turn the power amplifier on during transmit time slots and "off" during receive time slots (to conserve battery power). This same timing signal may be used by controller 64 to control the switching state of RF switches 46 and 50. During LMR transmit time slots, the transmitter path connected to duplexer 44, and the receiver is isolated/disabled by the appropriate switch settings of switches 46 and 50. For LMR receive time slots, the switches are set to their opposite settings to bypass the duplexer 44.

Of course, the present invention can readily be applied to other non-time slotted systems as well including both analog and digital. All that is necessary is an appropriate indication to the controller when the transceiver is transmitting or receiving in a particular frequency band so that the RF switches may be set to their appropriate state.

In a preferred embodiment of the present invention, the RF switches may be gallium arsenide (GaAs) field effect transistor (FET) microwave monolithic integrated circuits (MMICs). FIG. 11A shows an example gallium arsenic FET switch 150 commercially available for example from Alpha Industries, Inc. An input terminal (I/P), a drain voltage input terminal ($V_{DD}$) are both connected to the common drain of FETs 152 and 154. Control voltages $V_1$ and $V_2$ applied through bias resistors to the gates of FETs 152 and 154 to drive the switch outputs $O/P_1$ and $O/P_2$.

The advantages of using the GaAs FET switch 150 include low insertion loss, very fast switching speed, and simple control. Specifically, each GaAs FET 150 has an insertion loss on the order of 0.5 dB, and MMIC switching speeds are on the order of 10 nanoseconds. These advantages coupled with the switch's very small size and high linearity make for an excellent switch easily controlled using control signals from controller 64 synchronized with the radio transceiver's transmit/receive mode. As mentioned above, the control signal may be taken from the transmit-synchronous drain bias voltage applied to the power amplifier 76 which is a high or zero voltage level when the transceiver transmits and low or zero voltage level when the time slot ends. FIG. 10B shows in simple chart format the relationship between the isolation of outputs $O/P_1$ and $O/P_2$ as well as insertion loss provided by FET switches 152 and 154.

Thus the present invention has been described in the context of example embodiments. In general, the present invention advantageously increases the capacity and coverage of a mobile/portable radio communications system by providing or adapting a mobile/portable radio that can communicate over adjacent or contiguous frequency bands without having to use substantially additional hardware. In the example of contiguous LMR and cellular frequencies, only minor modifications to the hardware and software of a cellular radio are necessary to provide that radio with the ability to communicate over LMR frequency bands as well.

The second embodiment of the present invention is preferred because of its lower cost and smaller size as a result of using only one duplexer. By actively switching the two RF switches, the need for one duplexer for each set of adjacent frequency bands is eliminated. Using two switches in the LMR path maintains transmit-to-receive isolation, and because both the cellular and LMR transmit signals pass through the cellular duplexer, transmit low pass filtering service for both frequency band reduces harmonic spurious content to acceptable levels. Additionally, third order intermodulation performance of the MMIC switches is sufficiently high so that both transmit and receive distortion-driven requirements are maintained.

The above-described exemplary embodiments are intended to be illustrative in all respects, rather than restrictive, of the present invention. Although the foregoing exemplary embodiments have been described in terms of base and mobile stations, the present invention can be applied to any radio communication system. For example, satellites could transmit and receive data in communication with DBC remote devices, including portable units, personal digital assistants, etc.

Moreover, although the present invention has been described primarily in terms of communicating within the LMR spectrum, the present invention is also intended to be used in multiple hyperbands, e.g., in a dual-mode DBC and cellular band mobile phone. For example, the mobile station can be implemented to operate in the A-side cellular band and a portion of the LMR band. This DBC mobile station has the advantage of being able to use existing cellular networks which allow a DBC network operator to offer a nationwide roaming footprint. Readers interested in aspects of multiple hyperband capable systems are referred to commonly assigned U.S. patent application Ser. No. 08/425,051 entitled "Multiple Hyperband Mobile and Base Stations" to Krister Raith filed on Apr. 19, 1995, the disclosure of which is incorporated herein by reference. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A radio transceiver having the capability to transceive information over first and second sets of frequencies in first and second operational modes, respectively, each set of frequencies including a transmit frequency band and a receive frequency band, comprising:
 a transmitter;
 a receiver;
 an antenna;
 a single duplexer connectable to the antenna, transmitter, and receiver;
 switch circuitry; and
 a controller which, when the radio is operating in the first operational mode, controls the switching circuitry to connect the duplexer to the antenna, transmitter, and receiver so that signals are transceived using the duplexer and when the radio is operating in the second operational mode, controls the switching circuitry to connect the antenna to the transmitter through the duplexer and to the receiver bypassing the duplexer.

2. The radio transceiver in claim 1, wherein transmit frequency bands for the first and second sets of frequencies are contiguous and receive frequency bands for the first and second sets of frequencies are contiguous.

3. The radio transceiver in claim 2, wherein the first receive frequency band is 851–869 MHz, the first transmit band is 806–824 MHz, the second receive frequency band is 869–894 MHz, and the second transmit frequency band is 824–849 MHz.

4. The radio transceiver of in claim 1, wherein the second transmit frequency band is separated from the first receive frequency band by 2 MHz or less.

5. The radio in claim 1, wherein the switches are field effect transistors and are controlled in the first operational mode in accordance with timing information corresponding to when the radio is transmitting and receiving.

6. A radio transceiver having the capability to transceive information over first and second sets of frequencies in first and second operational modes, respectively, each set of frequencies including a transmit frequency band and a receive frequency band, comprising:
 a transmitter;
 a receiver;
 an antenna,
 a duplexer;
 switching circuitry for selectively connecting the duplexer to the antenna, transmitter, and receiver; and
 a controller which, when the radio is transmitting in the first and in the second frequency bands in the first and second operational modes, respectively, sets the switching circuitry to route the transmitted information to the antenna through the one duplexer,
 wherein the controller sets the switching circuitry to route received information from the antenna to the receiver through the one duplexer in the second operational mode, and sets the switching circuitry to bypass the duplexer when routing the received information from the antenna to the receiver in the first operational mode.

7. A method of adapting a cellular radio that transceives over cellular transmit and receive frequency bands to transceive in corresponding land mobile radio (LMR) transmit and receive frequency bands contiguous with cellular transmit and receive frequency bands using only one duplexer,
 wherein switches are connected to the one duplexer to an antenna of the radio and to the transmitter and receiver of the radio, the method further comprising:
 setting the switches to connect the duplexer between the antenna and the transmitter and receiver when the radio is transceiving in the cellular frequency bands,
 setting the switches to connect the duplexer between the antenna and the transmitter when the radio is transmitting in the LMR frequency bands, and
 setting the switches to bypass the duplexer in connecting the antenna and the receiver when the radio is receiving in the LMR frequency bands.

8. The method in claim 7, wherein the one duplexer is a cellular radio duplexer.

9. A method of operating a radio transceiver to transceive information over first and second sets of frequencies in first and second operational modes, respectively, each set of frequencies including a transmit frequency band and a receive frequency band, said radio transceiver including a transmitter, a receiver, an antenna, and only one duplexer connected to the antenna, transmitter, and receiver, comprising the steps of:
 (a) detecting the operational mode of the radio transceiver;
 (b) in the first operational mode, connecting the duplexer to the antenna, transmitter, and receiver in a first configuration where signals in the first set of frequencies are transceived using the one duplexer; and (c) in the second operational mode, selectively connecting the antenna to the transmitter through the duplexer and to the receiver bypassing the one duplexer in accordance with a control signal.

10. The method in claim 9, wherein the radio transceiver operates in accordance with a time division multiple access (TDMA) communications system each frequency carrying plural time slots per frame with each time slot in the frame corresponding to a separate channel, the method further comprising the step of:

generating the control signal based on a time slot alignment timing signal such that in the second operational mode, the antenna is connected to the transmitter through the duplexer during a transmit time slot and the antenna is connected to the receiver bypassing the one duplexer during a receive time slot.

11. The method according to claim 10, wherein during the transmit time slot, the connection between the antenna and the receiver is disabled.

12. A cellular radio transceiver having the capability to transceive information over cellular and land mobile radio sets of frequencies in first and second operational modes, respectively, each set of frequencies including a transmit frequency band and a receive frequency band, comprising:

a transmitter;

a receiver;

an antenna;

only one duplexer connected to the antenna, transmitter, and receiver, switch circuitry for selectively connecting the duplexer to the antenna, transmitter, and receiver in first and second different configurations; and a controller which, when the radio is operating in the cellular operational mode, controls the switching circuitry to connect the duplexer to the antenna, transmitter, and receiver in a first configuration where transmitted and received signals are routed through the one duplexer, and when the radio is operating in the LMR operational mode, controls the switching circuitry to connect the duplexer to the antenna, transmitter, and receiver in the second configuration where but received signals are routed from the antenna to the receiver bypassing the one duplexer, wherein transmitted signals are routed through the duplexer to the antenna in both the first and second configurations.

13. A cellular radio transceiver having the capability to transceive information over cellular and land mobile radio sets of frequencies in first and second operational modes, respectively, each set of frequencies including a transmit frequency band and a receive frequency band, comprising:

a transmitter;

a receiver;

an antenna;

only one duplexer connected to the antenna, transmitter, and receiver;

switch circuitry for selectively connecting the duplexer to the antenna, transmitter, and receiver in first and second different configurations; and a controller which, when the radio is operating in the cellular operational mode, controls the switching circuitry to connect the duplexer to the antenna, transmitter, and receiver in a first configuration where transmitted and received signals are routed through the one duplexer, and when the radio is operating in the LMR operational mode, controls the switching circuitry to connect the duplexer to the antenna, transmitter, and receiver in the second configuration where but received signals are routed from the antenna to the receiver bypassing the one duplexer, wherein the switch circuitry includes GaAs FET switches.

14. A cellular radio transceiver having the capability to transceive information over cellular and land mobile radio sets of frequencies in first and second operational modes, respectively, each set of frequencies including a transmit frequency band and a receive frequency band, comprising:

a transmitter;

a receiver;

an antenna;

only one duplexer connected to the antenna, transmitter, and receiver;

switch circuitry for selectively connecting the duplexer to the antenna, transmitter, and receiver in first and second different configurations; and a controller which, when the radio is operating in the cellular operational mode, controls the switching circuitry to connect the duplexer to the antenna, transmitter, and receiver in a first configuration where transmitted and received signals are routed through the one duplexer, and when the radio is operating in the LMR operational mode, controls the switching circuitry to connect the duplexer to the antenna, transmitter, and receiver in the second configuration where but received signals are routed from the antenna to the receiver bypassing the one duplexer, wherein the cellular radio includes a digital time slotted mode of operation with the controller switching the switching circuitry in accordance with receive and transmit time slot control signalling.

15. For a cellular radio transceiver, including a transmitter, a receiver, an antenna, and a duplexer connected to the antenna, transmitter, and receiver, for transceiving information over cellular frequencies, a method of modifying the cellular radio transceiver to additionally transceive in land mobile radio (LMR) frequencies, comprising:

adding switch circuitry for selectively connecting the duplexer to the antenna, transmitter, and receiver in first and second different configurations;

for communications in the cellular frequencies, operating the switching circuitry to connect the duplexer to the antenna, transmitter, and receiver in the first configuration where transmitted and received signals are routed through the duplexer; and for communications in the LMR frequencies, operating the switching circuitry to connect the duplexer to the antenna, transmitter, and receiver in the second configuration where received signals are routed from the antenna to the receiver bypassing the one duplexer, and where transmitted signals are routed through the duplexer to the antenna in both the first and second configurations.

* * * * *